(12) United States Patent
Burgart et al.

(10) Patent No.: US 12,706,750 B2
(45) Date of Patent: Aug. 11, 2026

(54) KEY STORAGE SYSTEM AND METHOD

(71) Applicant: Transportation IP Holdings, LLC, Norwalk, CT (US)

(72) Inventors: Phillip A. Burgart, Cedar Rapids, IA (US); Jeffrey D. Kernwein, Cedar Rapids, IA (US); William Fleming, Chicago, IL (US); Stephen Craven, Hiawatha, IA (US); Benjamin Gardner, Cedar Rapids, IA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 130 days.

(21) Appl. No.: 18/908,104

(22) Filed: Oct. 7, 2024

(65) Prior Publication Data

US 2025/0119295 A1 Apr. 10, 2025

Related U.S. Application Data

(60) Provisional application No. 63/588,604, filed on Oct. 6, 2023.

(51) Int. Cl.
*H04L 9/32* (2006.01)

(52) U.S. Cl.
CPC .......... *H04L 9/3242* (2013.01); *H04L 9/3247* (2013.01); *H04L 9/3297* (2013.01)

(58) Field of Classification Search
None
See application file for complete search history.

(56) References Cited

U.S. PATENT DOCUMENTS 11,463,246 B2 * 10/2022 Darnell .................. G06Q 50/40
2004/0003232 A1 * 1/2004 Levenson ........... B60R 16/0234 713/155
2020/0294401 A1 9/2020 Kerecsen
2021/0029147 A1 1/2021 McCanty et al.
2021/0174607 A1 * 6/2021 Ju ......................... H04L 9/0891
2023/0345239 A1 * 10/2023 Pan ....................... H04W 12/03

OTHER PUBLICATIONS

First Examiner's Requisition for corresponding Canadian Patent Application No. 3255560 dated Nov. 3, 2025.

* cited by examiner

*Primary Examiner* — Fatoumata Traore
(74) *Attorney, Agent, or Firm* — K&L Gates LLP

(57) ABSTRACT

A system is provided that may include a first storage device, a second storage device, and a controller. The first storage device may receive and store a first message including a first operational key for a first component and a second operational key for a second component. The first message may contain first metadata including at least a time stamp of the first message. The second storage device may receive and store a second message including the first and second operational keys. The second message may contain second metadata including a time stamp of the second message. The controller may compare the first and second messages to determine a most recent version of the first and second operational keys based on the time stamp of the messages. The controller may sync the most recent version of the first and second operational keys to the first and second storage devices.

12 Claims, 3 Drawing Sheets

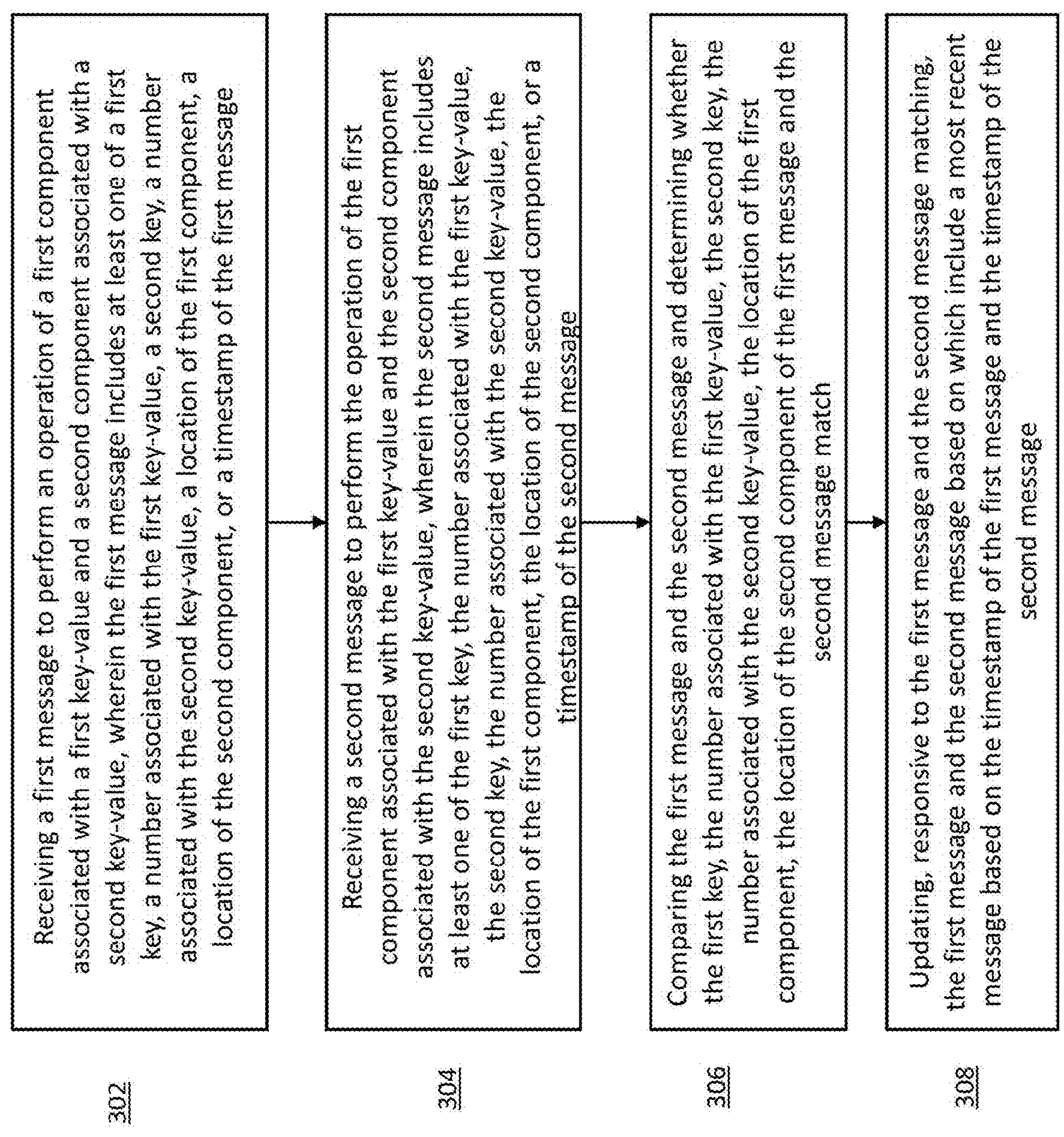
Figure 3
300
302
Receiving a first message to perform an operation of a first component associated with a first key-value and a second component associated with a second key-value, wherein the first message includes at least one of a first key, a number associated with the first key-value, a second key, a number associated with the second key-value, a location of the first component, a location of the second component, or a timestamp of the first message
304
Receiving a second message to perform the operation of the first component associated with the first key-value and the second component associated with the second key-value, wherein the second message includes at least one of the first key, the number associated with the first key-value, the second key, the number associated with the second key-value, the location of the first component, the location of the second component, or a timestamp of the second message
306
Comparing the first message and the second message and determining whether the first key, the number associated with the first key-value, the second key, the number associated with the second key-value, the location of the first component, the location of the second component of the first message and the second message match
308
Updating, responsive to the first message and the second message matching, the first message and the second message based on which include a most recent message based on the timestamp of the first message and the timestamp of the second message

KEY STORAGE SYSTEM AND METHOD

CROSS-REFERENCE TO RELATED APPLICATION

This application claims benefit under 35 U.S.C. § 119(e) to U.S. Provisional Application No. 63/588,604, filed Oct. 6, 2023, entitled "KEY STORAGE SYSTEM AND METHOD," the entire disclosure of which is hereby incorporated by reference herein.

BACKGROUND

Technical Field

This disclosure relates generally to methods and systems of key storage, specifically digital key storage for a distributed data storage system.

Discussion of Art

Systems or networks may use distributed data storage for storing application data, component data, user data, etc. The data storage is accessible (e.g., either directly or indirectly) to a large number of clients, including tenants and individual users associated with respective tenants. Clients query a server to retrieve specific data from the distributed data storage. In some examples, queries are executed according to a protocol such as standard query language (SQL), NoSQL, etc.

Some distributed data storage systems implement a key-value database. In a key-value database, a key-value cluster includes one or more key-value storage devices, for example servers or nodes, storing data. Accordingly, data is distributed across multiple key-value servers. Clients transmit a request for data that includes a key mapped to one or more values representing specific data. A key-value cluster receives the request and retrieves the data from the appropriate key-value server based on the included key. For example, the key-value cluster may implement a key-value table that stores key-value pairs to enable retrieval of data (i.e., the value) paired with the respective key.

The key may be needed to authenticate communication between one or more components of a system. The key may be stored on the storage device in proximity to the system. When the components of the system or the storage devices need to be repaired or replaced, there may be an issue with persistence of the keys during the repair and/or replacement. It may be desirable to have a system and method that differs from those that are currently available.

BRIEF DESCRIPTION

In accordance with one example or aspect, a system is provided that may include a first storage device, a second storage device, and a controller. The first storage device may receive and store a first message including a first operational key for a first component and a second operation key for a second component. The first message may contain first metadata that may include at least one of a time stamp of the first message, a location of the first component, or a location of the second component. The second storage device may receive and store a second message that may include the first operational key for the first component and the second operational key for the second component. The second message may contain second metadata that may include at least one of a time stamp of the second message, the location of the first component, or the location of the second component. The controller may include one or more processors that may compare the first message and the second message to determine a most recent version of the first operational key and a most recent version of the second operational key based on the time stamp of the first message and the time stamp of the second message. The controller may sync the most recent version of the first operational key and the most recent version of the second operational key to the first storage device and the second storage device.

In accordance with one example or aspect, a method is provided that may include receiving a first message to perform an operation of a first component associated with a first key-value and a second component associated with a second key-value. The first message may include at least one of a first key, a number associated with the first key-value, a second key, a number associated with the second key-value, a location of the first component, a location of the second component, or a timestamp of the first message. The method may include receiving a second message to perform the operation of the first component associated with the first key-value and the second component associated with the second key-value. The second message may include at least one of the first key, the number associated with the first key-value, the second key, the number associated with the second key-value, the location of the first component, the location of the second component, or a timestamp of the second message. The method may include comparing the first message and the second message and determining whether the first key, the number associated with the first key-value, the second key, the number associated with the second key-value, the location of the first component, the location of the second component of the first message and the second message match. The method may include updating, responsive to the first message and the second message matching, the first message and the second message based on which include a most recent message based on the timestamp of the first message and the timestamp of the second message.

In accordance with one example or aspect, a system is provided that may include a first storage device, a second storage device, and a controller. The first storage device may receive a first message to perform an operation on a first component and a second component of a vehicle system associated with a first key-value pair and a second key-value pair. The message may include at least one of a first key associated with the first component, a second key associated with the second component, a vehicle identification number, or a timestamp of the first message. The second storage device may receive a second message to perform an operation on the first component and the second component of the vehicle system associated with the first key-value pair and the second key-value pair. The message may include at least one of the first key associated with the first component, the second key associated with the second component, the vehicle identification number, or a timestamp of the second message. The controller may include one or more processors that may compare the first key, the second key, and the vehicle identification number of the first message and the second message. Responsive to the first key, second key, and the vehicle identification number of the first message and the second message matching, the controller may determine a most recent message based on the timestamp of the first message and the timestamp of the second message and the one or more processors may update the first message and the second message based on the most recent message.

BRIEF DESCRIPTION OF THE DRAWINGS

The subject matter may be understood from reading the following description of non-limiting embodiments, with reference to the attached drawings, wherein below:

FIG. 3 shows a flowchart of one example of a method for distributed key storage.

DETAILED DESCRIPTION

Figure 1:
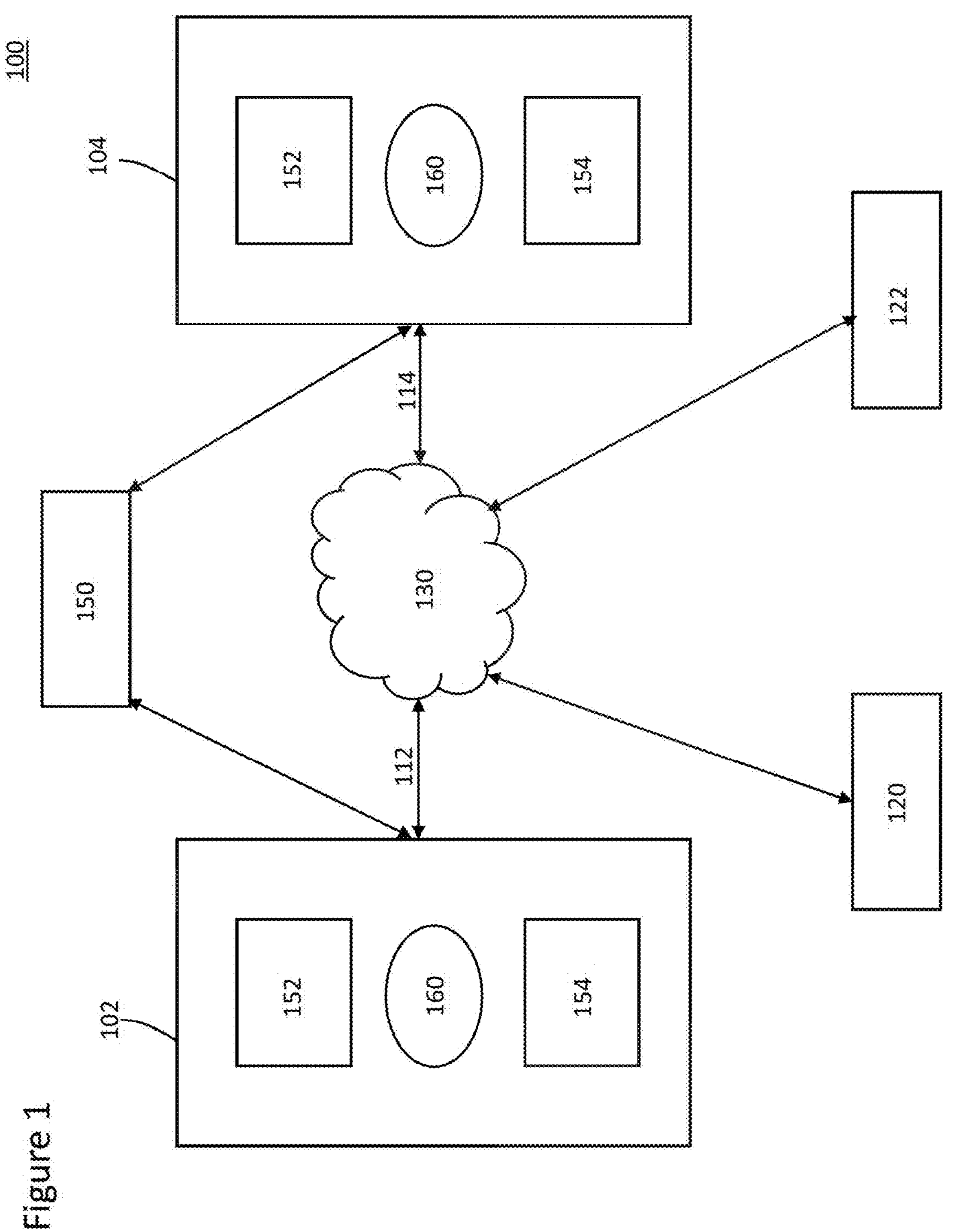
FIG. 1 shows one example of a distributed key storage system.

Embodiments of the subject matter described herein relate to systems and methods for digital key storage. In particular, the key storage locations so as to secure communication between one or more components of a system. The systems and methods may include redundant key storage devices. There may be more than one redundant key storage device.

A suitable key storage location may be on one or more different key storage devices of the system. The inventive system may store and update keys. Suitable keys may be, for example, encrypted certificate keys. A key may be one of a pair of keys, where both keys are needed for functionality. The key storage locations may be disposed across multiple nodes or servers. During use, the key may authenticate communication between one or more components of the system. The key may be used for other communication purposes, such as to authenticate or allow communication with a back office of the system. The key storage device(s) may securely store the keys, may allow updates from the one or more components, may store which component wrote the last key, may provide audit traceability, fraudulent access alerts, and may persist through equipment replacement.

The key storage device(s) may be in communication with one or more modules that may provide additional security of the keys. The modules may allow the information on the key storage device to be signed or otherwise marked or identified by the modules. This may prevent or reduce the chance of the data stored within being modified, changed, tampered with, erased, accessed or read, or otherwise impacted when the data is stored on the key storage device.

Reliability of the key storage devices may be desirable and/or beneficial. As such, having more than one key storage device may allow the system to have built in redundancies that may provide greater reliability. The greater reliability of the multiple key storage devices may be highlighted if one of the key storage devices may need repair or replacement. The other key storage device may maintain the key during the repair or replacement. Further, the redundancy of storing the keys on multiple key storage devices may allow the system to avoid reprogramming and/or reconfiguration when other components of the system may be repaired, replaced, or removed.

Embodiments of the key storage system described herein may be applicable to a number of implementations. The key storage system may be used in computer systems, smart-phones, personal digital assistance devices (PDAs), laptop computers, vehicle controllers, wayside devices, and the like. In various embodiments, a suitable vehicle system may be a rail vehicle, automobile, on-road truck (with or without trailer), bus, marine vessel, aircraft, unmanned aircraft (e.g., drones), mining vehicle, agricultural vehicle, other off-highway vehicle, and the like. Vehicle systems may be formed from plural vehicles, working in a coordinated manner. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy, swarm, platoon, fleet or consist). A vehicle consist may be a group of two or more vehicles that are mechanically coupled or otherwise linked via communication to travel together along a route. Trains may have one or more vehicle consists. Vehicles in consist may include a lead vehicle and one or more trail vehicles. Examples of vehicles that may be used in consist may include locomotives, passenger vehicles, marine vessels, and mining trucks.

Communication among components of a consist may help the coordination of various functions of the system. In a rail consist, functions such as throttle control, braking and direction, for example, are important to coordinate among locomotives during operation of a train. In a trucking platoon, the functions may be acceleration, braking, and steering. Communication enabled by the keys may occur between a vehicle and wayside equipment. Suitable wayside equipment may include crossing devices, PTC equipment, personal safety devices, and the like. Other communication enabled by the keys may occur between the vehicle and a back office system (e.g., a dispatch or traffic control system). Other communication enabled by the keys may include vehicle to vehicle communication. Radio frequency schemes may be used for intra-vehicle communication within the consist with various combinations of transmitters, receivers and/or transceivers being distributed throughout.

In one embodiment, a vehicle seeking to depart an origination location and travel on a route through a network to a destination location may need one or more updates. These updates may be, for example, a current network map, a current operational trip plan, a current schedule of travel restrictions and allowances, and the like. The network map may include an indicated route through the network. The trip plan may include the engine and traction motor operational settings for each point along the indicated route. The travel restrictions and allowances may include the bulletins that specify the speed limits, the work zones, and other factors that overlay the vehicle operations. When the updates arrive at the vehicle, a key from the key storage located onboard the vehicle may be used to authenticate the update. After authentication, the vehicle controller may update its onboard data files to initialize the trip.

FIG. 1 illustrates a distributed key storage system 100, according to one example. The distributed key storage system may include a network 130, a first storage device 102, a second storage device 104, a first component 120, a second component 122, and one or more controllers 150. The network may include a local area network (LAN), a wide area network (WAN) such as the internet, an ethernet network that may communicate data packets between components connected to the network, or another type of network.

The networks described herein can be formed from an arrangement of various communication devices and related hardware. The hardware may include cables interconnecting devices, wireless devices interconnecting other devices, routers interconnecting devices, switches interconnecting devices, transceivers, antennas, power sources, and the like. With respect to examples including vehicle systems, one or more networks described herein can be entirely off-board all vehicles. Optionally, at least part of a network can be disposed onboard one or more vehicles, such as by having one or more hardware components that form the network being onboard a vehicle and communicating in the network as the vehicle is moving. Additionally or alternatively, a network can be disposed entirely onboard a vehicle or vehicle system, such as when the components communicating with each other to form the network are all disposed onboard the same vehicle or onboard multiple vehicles that travel together along routes as a vehicle system.

The network may communicatively couple the first storage device and the second storage device such that the network may send and receive messages, information, data, or the like to and from the first and second storage devices. Additionally, the network may communicatively couple the first component and the second component, such that the components may be directly connected with the network without having to be directly connected to each other. Communication among the components of the system may help the coordination of various functions of the system. In order to communicate, components may use operational keys specific to each component that may authenticate and allow communication between components.

With regard to the communication and communication systems, the communication systems may include one or more communication devices that may communicate with one or more of the components and/or other remote locations that are remote from the system. The communication devices may include or represent an antenna (along with associated transceiver hardware circuitry and/or software applications) for wirelessly communicating with other systems and/or remote locations. Optionally, the communication device may communicate via one or more wired connections, such as a multiple unit (MU) cable, a trainline, an electrically controlled pneumatic (ECP) brake line, or the like.

The storage devices may include computing nodes. Each node may be a computer system or controller having one or more processors 152 and a memory 154. Suitable memory may be volatile or nonvolatile memory, cache, or the like. The storage device may include one or more input devices (e.g., a keypad, touchpad, mouse, or the like), a display, and a network interface that may connect the storage device to the network. The network interface may include a wired interface (e.g., an Ethernet interface) and/or a wireless interface (e.g., Wi-Fi, Bluetooth, near field communication (NFC), or the like). The system may include more than two storage devices.

The storage devices may store and update keys, for example, encrypted certificate keys. The keys may be needed to authenticate communication between the components of the system. The keys may be unique or specific to each component of the system. The keys may be used to enable other functions or other communication, such as accessing onboard control systems. The storage devices may securely store the keys, allow updates from the components, store which component wrote the last key, and persist through equipment replacement.

In one example, a first message 112 may be sent via the network to the first storage device. The first message may be sent by the first component, the second component, or the controller. The first message may include a first operational key for the first component and a second operational key for the second component. A second message 114 may be sent via the network to the second storage device. The second message may include the first operational key for the first component and the second operational key for the second component. The operational keys may allow communication between the components of the system. Additionally, the operational keys may include instructions for how to operate the components. For example, the operational keys may include operational settings for the components. Where the components include a traction system and a brake system of a vehicle, the operational settings may include speed limits, braking instructions, motoring instructions, or the like. The operational settings may be received through an update to a trip plan and may be authenticated and communicated to the components via the operational keys and message data. The operational keys may allow an operator of the system to change the operational settings of the components during operation of the system.

The first message and the second message may provide a redundancy for the operational keys for both the first and second components. Because both the first and second messages include the first and second operational keys and are provided to the first storage device and the second storage device, respectively, the storage devices serve as redundant key storage devices. This may allow the operational keys to be available and accessible during a repair, replacement, or failure of one of the storage devices.

The network or the storage devices may provide an internet protocol (IP) address and a port for each component. The components may connect to read and write the operational key(s) for the component to the storage devices via the IP address and port. The operational key for each component may only be read or written when the component is connected to the associated IP address and port. The component may be a client in the connection with the network. When the connection with the associated IP address and port is established, the component may send the message that may include fields that specify: the operation (read or write), the operational key type (e.g., first component, second component, etc.), written by (e.g., first component, second component, etc.), the message coordination number, or the like.

The network may connect the storage devices to one another. In one example, the memory of the storage devices may be treated as a generic storage block, where the memory may have no knowledge about what is stored. The information and data stored on the storage device may include metadata, discussed further with reference to FIG. 2. By having more than one storage device, the system may improve replication of the system. Replication may include maintaining multiple copies of the operational key(s) across different storage devices and may provide fault tolerance and ensure the operational key(s) remain accessible even if one or more of the storage devices may be unavailable. Replication strategies may include master-slave, leader-follower, multi-master approaches, and the like.

The first message data may set and retrieve the operational keys from the first storage device. The first message data may include the item name (i.e., the component associated with the message), item metadata (e.g., a timestamp, a component identification (ID) number, etc.), item data (i.e., the actual bytes for the encrypted key, public key used to sign the message, signature of the message), instructions for controlling or modifying the components, or the like. The public key may be a namespace for the key that may use a code to identify and refer to specific components or systems. The public key may be a part of a global system of authentication, trust management, and privacy protection schemes where Certification Authorities (CA) may act as electronic credentials issuers. In one example, each component may have a different public key. The storage device may verify the signature of the message using the public key. The system may refuse to send the operational key if the signature does not match the public key. As such, the public key verification may reduce or prevent unauthorized attempts to access the system. In one embodiment, the private key may be used instead.

A suitable controller may include processors, microprocessors, microcontrollers, or other logic devices that operate based on instructions stored on a tangible and non-transitory computer readable storage medium, such as software applications stored on a memory. The controller may perform a bit-by-bit comparison of the data stored on the first storage device and the data stored on the second storage device. The comparison may include comparing the metadata stored on the first storage device and the second storage device. The metadata may include a time stamp indicating when the first message was received by the first storage device and a time stamp indicating when the second message was received by the second storage device. The time stamp may indicate when the first message was sent by the network and when the second message was sent by the network.

The comparison by the controller may determine a most recent version of the first operational key and a most reason version of the second operational key based on the time stamp of the first message and the time stamp of the second message, respectively. Responsive to the message data and metadata indicating a match between the first message and the second message, the controller may sync the most recent version of the first operation key and the most recent version of the second operational key to the first storage device and the second storage device. A match may be determined by the controller responsive to all the message data fields being the same between the first message and the second message. In one example, a match may be determined by the controller responsive to a predetermined number of the message data fields being the same between the first message and the second message. A match may be determined responsive to predetermined fields of the message data being the same between the first message and the second message.

The first storage device may be a primary storage device and the second storage device may be a backup storage device for the first and second operational keys in the system. However, in one embodiment, the second storage device may be the primary storage device and the first storage device may serve as the backup storage device for the first and second operational keys in the system. In that role, the backup storage device may maintain a copy of the operational key(s) of the primary storage device. If a primary storage device may fail, the backup storage device may handle the failed primary storage device's operational keys by making available its copy of the operational keys. In one example, the primary storage device may fail as a result of the primary storage device being repaired or replaced. There may be at least two copies of each operational key and these two copies may store the same operational key on both the primary storage device and the backup storage device.

However, one of the storage devices may need to be repaired, updated, or replaced. If an update or repair may be in progress for either the first storage device or the second storage device, the first and second storage devices may have a different value, until the update process is complete. Said another way, the storage device that is being updated or repaired may not be responding or may be responding with a different key. This may be referred to as the storage device having a "stale" value when certain storage device failures occur. However, as described below, a read operation may resolve inconsistencies between storage devices by returning a value written by the most recently completed write, even where a storage device replacement, repair, or failure may have occurred. As such, the key of the updated storage device may be synced with the other storage device.

The system may be designed such that the first storage device and the second storage device are not replaced or repaired at the same time. The controller may store instructions to ensure that two storage devices are not replaced at the same time, as well as allowing enough time for the storage devices to sync after replacement. This may allow the system to maintain accessibility, reliability, security, and persistence of the operational keys.

The system may include various recovery scenarios responsive to one of the storage devices being repaired, replaced, inspected, updated, or the like. Where one of the storage devices, for example the first storage device, may be repaired the data on the newly repaired first storage device may be old as new data may have become available during the repair. For example, there may have been an update during the repair, such as a current network map update, a trip plan update, a travel restriction and allowance update, or the like. Based on the update, the data on the first storage device may be outdated and different than the data on the second storage device. Responsive to the data on the newly repaired first storage device being determined by the controller to be older, based on the timestamp, the first storage device may sync data from the second storage device. The synced data from the second storage device may provide updated data to the newly repaired first storage device.

In one example, the data on the newly repaired first storage device may be different than the data on the second storage device, such that the data on the first storage device may not match the data on the second storage device. For example, the metadata may indicate that the message may be directed to a different component. Responsive to the data on the newly repaired first storage data not matching the data on the second storage data, the newly repaired first storage data may sync data from the second storage data. This may ensure that any changes that occurred during the repair of first storage device are captured by the second storage device and may be communicated to the first storage device after completion of the repair. This may ensure the persistence, reliability, and accessibility of the data on the first storage device and the second storage device. While the above examples describe the first storage device being repaired, the same would apply where the second storage device is repaired.

The system may be designed such that the operational keys may persist through the repair or replacement of the components. In one example, the first component may be replaced. If the first component may have a downloaded certificate, the first component may use the certificate to decrypt the operational key from the first storage device. The downloaded certificate may be a verification that the component may be permitted and able to read and write the operational key. If the first component may not have a downloaded certificate, a manual insertion of the operational key into the first storage device may need to be done. The downloaded certification may reduce or prevent unauthorized access to the system.

The information stored on the storage devices may need to have a threshold level of accessibility and availability. The storage devices that communicate on the network may have access to the operational keys for authenticating the components on the same network. The information may remain accessible even if some storage devices may be unavailable, for example due to repair.

The information or data stored on the storage devices may be persistently stored. Being persistently stored may include the data being durable and may not be lost in the event of a system/component reprogram, reconfiguration, removal, replacement or the like. Persistent storage may involve writing data to a disk or other non-volatile storage medium or system.

The first message and the second message may include a determined level of consistency that may contribute to replicas of the messages reflecting the same value at any given time. Consistency of the messages may include the operational key of the key store on the other storage devices are the same when read from the store. Note, the data on each storage device may not always be the same at the same time (e.g., when a write is made to an operational key on a primary storage device, the backup storage device may store a previous value, until being updated as part of the write operation.) Should the primary storage device fail before the backup storage device may be updated, the write operation may fail. More specifically, consistency may mean that any two successive reads will return the same value, unless, and only unless, a write operation occurred between the two reads. This property may be referred to as read-after-read (RAR) consistency. The process for read-after read consistency may be used to reject stale writes from older storage devices or clients.

The system may be upwardly scalable. The system may be able to add storage devices that may be capable of accommodating increasing data loads and user demands to meet the storage capacity needed. Additionally, the system may be able to utilize existing devices in the system that may have sufficient architecture and memory to store the data and operational keys. By using existing devices, the system may reduce cost and complexity of implementation.

In one example, the components may be components of a vehicle system. The components may include an energy management system, a command system, a control system, a traction system, a propulsion system, a navigation system, a braking system, or the like. The network may allow all the components of the vehicle system to be communicatively coupled. The storage devices may be located on-board the vehicle system and may securely store the operational keys. The storage devices may allow updates, repairs, or replacements from a given component while maintaining access to the operational key of the given component. In one example, the storage devices may be devices that may already be in the system, for example a navigation module, a display, a computer system, or the like. In another example, the storage device may be an independent device that may be added to the system.

The operational keys may direct operation of the components of the system. The operational keys may communicate signals to control/modify movement of the vehicle system, direct the components of the vehicle system to operate in an energy saving mode, direct the components of the vehicle system to operate in a high-performance mode, or the like. For example, the operational key may provide instructions to the energy management system and the control system to operate in the energy saving mode. In another example, the operational key may provide instructions to the propulsion system and the braking system to control movement of the vehicle system.

The operational keys may direct the operation of the system by allowing communication between the components of the system. For example, the energy management system may send a command to control the movement of the vehicle system, such as a command to operate the vehicle system in an autopilot or autonomous mode. The command may need to have security protection to ensure that the command may not be able to be intercepted or modified by an unauthorized user. The operational key may provide that protection, as discussed above. The command may then be able to be communicated from the energy management system to the control system, propulsion system, and/or braking system of the vehicle system in order to implement the command. In one example, the back office controller may send a command to modify movement of the vehicle system, such as a command to change the route of the initial trip plan. The command may then be communicated from the back office controller to the navigation system, the control system, the propulsion system, and/or the braking system in order to implement the command and change the route. As such, the operational keys may direct the operation of the system by allowing communication between the components, without directly controlling operation of the system.

The operational keys may enable access to onboard control systems of the vehicle system. In one example, the vehicle system may need one or more updates before departing from an origination location and travelling on a route through a network to a destination. The updates may include network map updates, trip plan updates, travel restriction and allowance updates, or the like. The updates may be related to the operation of the vehicle system. When the updates arrive at the vehicle, a key from the key storage located onboard the vehicle may be used to authenticate the update. After authentication, the vehicle controller may update its onboard data files to start the trip.

As used herein, the control system may include a positive vehicle control (PVC) system. A PVC system is a control system in which permission is determined for allowing a vehicle system is allowed to move, and/or whether it is allowed to move outside a designated restricted manner (such as above a designated speed limit), only responsive to receipt or continued receipt of one or more signals (e.g., the operational key) that meet designated criteria, e.g., the signals have designated characteristics (e.g., the first operational key matches the second operational key) and/or are received at designated times (or according to other designated time criteria) and/or under designated conditions. This is opposed to 'negative' vehicle control systems where a vehicle is allowed to move unless a signal (restricting movement) is received. A suitable PVC system is the interoperable electronic train management system (I-ETMS) positive train control system that is commercially available from Wabtec Corporation.

In one embodiment, the components are configured to communicate with each other; however safeguards may be needed so that access to the components and communication may be restricted to only intended users or operators. Safeguards may include encryption of the keys, a security module 160, or the like. The security module may provide an additional safeguard for security and protection. The security module may sign the data in the messages. The system may prevent the modification of the data without the signature of the security module. The security module may prevent the data from being tampered with when stored on the storage devices.

In one example, the distributed key storage system may be a key-value storage system. The key-value storage system may function similarly to the distributed key storage system described above. A key-value storage system, or key-value database is a database that may use an associative array as the fundamental data model where each key may be associated with one and only one value in a collection. This relationship may be referred to as a key-value pair. A key-value pair may be two pieces of data associated with each other. The key may be a unique identifier that indicates the component the key may be associated with, and a value may either be the data being identified (e.g., the message or metadata) or a pointer to that data.

The key-value storage system may generally include receiving, by the first storage device, a message from a requesting component to perform a read operation to read a value stored in a key-value store for a first key. The message itself may include the first key and a lock sequence number and wherein the requesting component holds a lock for at least the first key. Upon determining the lock sequence number is equal to or greater than a stored sequence number stored with the first key in the key value store, the value of the first key may be read from the key-value store. The key value may then be returned to the requesting component.

The key-value storage system may store information, such as metadata for a distributed key storage system. The key-value storage system may be fault-tolerant and strongly consistent. Fault-tolerance may mean that the distributed key-value storage system continues to provide access to values in the key-value store in spite of a certain number of storage device failures. To provide this capability, the key-value store may store copies of (key, value) pair on multiple storage devices in order to provide fault tolerance for the failure of a given number of storage devices. The given number of storage devices may be one less than the number of storage devices used. For example, where two storage devices are used, the fault tolerance for failure may be one storage device. Where three storage devices are used, the fault tolerance for failure may be two storage device, and so on. Doing so allows the key, value store to tolerate a failure of the given number of storage devices, while still maintaining a consistent and available key-value store.

The components may be client devices that may write data to and retrieve data from key-value clusters that includes key-value servers. The storage devices may be the key-value clusters. The components (e.g., clients) may communicate with storage devices (e.g., the key-value cluster via the network.) The storage devices may include a key-value processing system that may be implemented using the processor and the memory. The components may write data to the storage components using a key, as described above. For example, the component may generate a write request to store data to the storage device. The key-value processing system may generate a key corresponding to the write request. The key may include primary data and metadata. The primary data may identify the component and the metadata may identify details of the data, the component, the timing, or the like.

A distributed key-value store may build on the advantages and use cases described above by providing them at scale. A distributed key-value store may be built to run on multiple computers working together, and thus may allow operation with larger data sets because more servers with more memory now hold the data. By distributing the store across multiple servers, processing performance may be increased. Replication may be leveraged in the distributed key-value store in order to increase fault tolerance.

Figure 2:
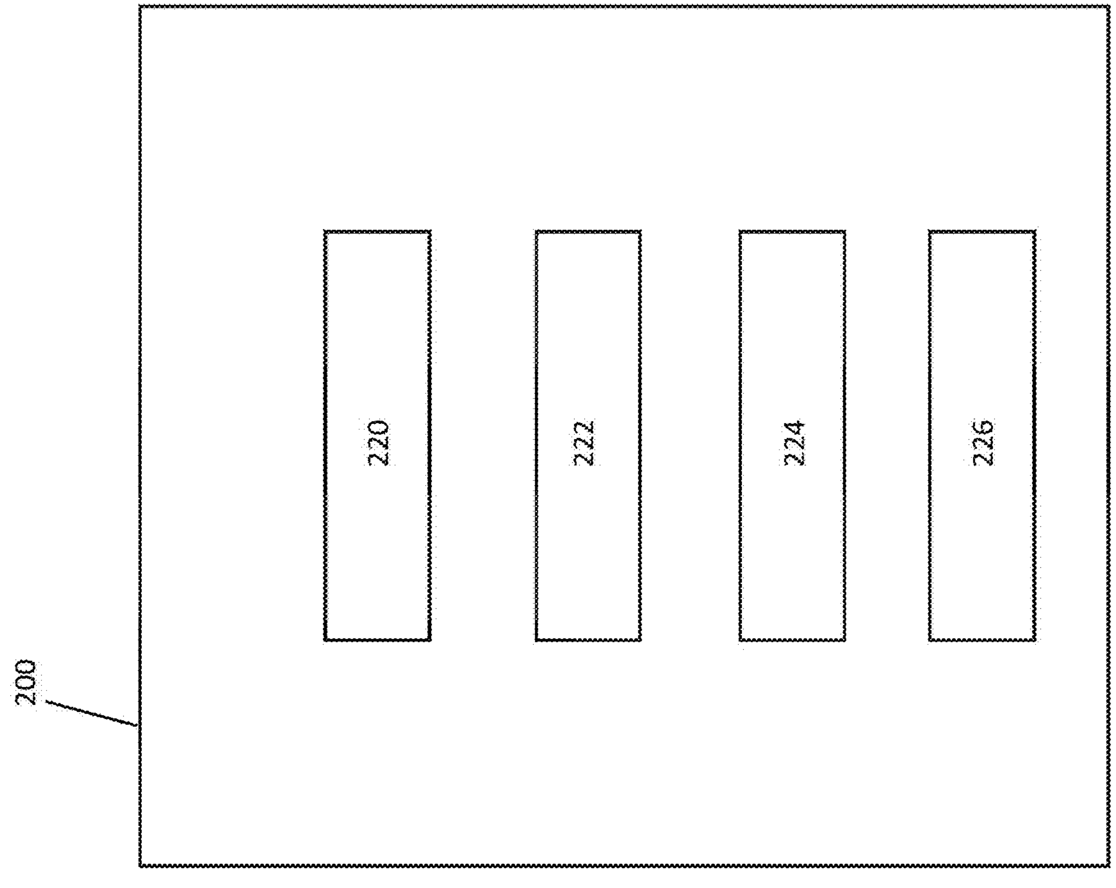
FIG. 2 shows one example of a message including meta-data.

FIG. 2 illustrates a message 200 including metadata, according to one example. The message may be the first message and/or the second message described in FIG. 1 or maybe another message. The metadata may include a timestamp of the message 220. The timestamp of the message may be a time the message was sent or a time when the message was received. The metadata may include a component ID 222. The component ID may be a unique identifier that may be associated with a particular component. The metadata may include a location of a first component 224 and/or a location of a second component 226. The location of the components may be determined using a navigation system or positioning system, for example a global navigation satellite system (GNSS) receiver such as a global positioning system (GPS) receiver, another wireless triangulation system, or the like.

The metadata included in the message may provide additional reliability, security, and accessibility. The metadata may confirm the message may be current and may be from the desired component. Additionally, the metadata may verify the operational keys on the storage devices are aligned and may be accessible by only the devices or operators who may have the required credentials (e.g., the ability to read the encrypted operational key).

FIG. 3 illustrates a method 300 of distributed key storage, according to one example. The distributed key storage may allow for replicated persistent key storage, for example storage of keys for components of a system. The distributed key storage may provide redundancy to replicate data or information across multiple storage devices. The data may include metadata that may indicate a timestamp of the data or other identifying information associated with the data.

At step 302, the method may include receiving a first message to perform an operation of a first component associated with a first key-value and a second component associated with a second key-value. The first message may include at least one of a first key, a number associated with the first key-value, a second key, a number associated with the second key-value, a location of the first component, a location of the second component, or a timestamp of the first message. The first message may be received and stored on a server device, for example a first storage device. The storage device may include computing nodes. Each node may be a computer system with one or more processors or controllers and a memory. The memory may be volatile or nonvolatile memory, cache, or the like. The storage device may further include one or more input devices (e.g., a keypad, touchpad, mouse, or the like), a display, and a network interface that may connect the storage device to a network.

At step 304, the method may include receiving a second message to perform the operation of the first component associated with the first key-value and the second component associated with the second key-value. The second message may include at least one of the first key, the number associated with the first key-value, the second key, the number associated with the second key-value, the location of the first component, the location of the second component, or a timestamp of the second message. The second message may be received and stored on a server device, for example a second storage device. The second storage device may include the same or similar components described above with respect to the first storage device.

At step 306, the method may include comparing the first message and the second message and determining whether the first key, the number associated with the first key-value, the second key, the number associated with the second key-value, the location of the first component, the location of the second component of the first message and the second message match. The comparison may be done by one or more controllers. The one or more controllers may include processors, microprocessors, microcontrollers, or other logic devices that operate based on instructions stored on a tangible and non-transitory computer readable storage medium, such as software applications stored on a memory. The controller may perform a bit-by-bit comparison of the first message and the second message. The comparison may include comparing metadata of the first message with metadata of the second message. The metadata may include a time stamp indicating when the first message was received by the first storage device and a time stamp indicating when the second message was received by the second storage device. The time stamp may indicate when the first message was sent and when the second message was sent.

At step 308, the method may include updating, responsive to the first message and the second message matching, the first message and the second message based on which include a most recent message based on the timestamp of the first message and the timestamp of the second message. A match may be determined by the controller responsive to all the message data fields being the same between the first message and the second message. In one example, a match may be determined by the controller responsive to a predetermined number of the message data fields being the same between the first message and the second message. A match may be determined responsive to predetermined fields of the message data being the same between the first message and the second message.

Updating the messages may allow for the storage devices to store the most current message, which may increase the reliability of the method. By allowing communication between the storage systems and updating the messages, the method may allow for individual devices (e.g., one of the storage devices, one of the components, etc.) to be repaired or replaced without having to reprogram or reconfigure the devices after repair or replacement. This may increase reliability and persistence of the method.

In one embodiment, a system is provided that may include a first storage device, a second storage device, and a controller. The first storage device may receive and store a first message including a first operational key for a first component and a second operation key for a second component. The first message may contain first metadata that may include at least one of a time stamp of the first message, a location of the first component, or a location of the second component. The second storage device may receive and store a second message that may include the first operational key for the first component and the second operational key for the second component. The second message may contain second metadata that may include at least one of a time stamp of the second message, the location of the first component, or the location of the second component. The controller may include one or more processors that may compare the first message and the second message to determine a most recent version of the first operational key and a most recent version of the second operational key based on the time stamp of the first message and the time stamp of the second message. The controller may sync the most recent version of the first operational key and the most recent version of the second operational key to the first storage device and the second storage device.

In one example, the first component and the second component may be components of a vehicle system. The first metadata of the first message and the second metadata of the second message may each include a vehicle identifier. The first storage device and the second storage device may communicate with an off-board system of the vehicle system.

The first storage device may communicate with the second storage device to authenticate the first operational key and the second operational key. The first operational key and the second operational key may be encrypted keys. The first storage device may include a verification module that may sign the first message and may prevent the first message from being modified on the first storage device without verification of an operator. The first storage device may maintain storage of the first message through a replacement of one or both of the first component and the second component.

In one embodiment, a method is provided that may include receiving a first message to perform an operation of a first component associated with a first key-value and a second component associated with a second key-value. The first message may include at least one of a first key, a number associated with the first key-value, a second key, a number associated with the second key-value, a location of the first component, a location of the second component, or a timestamp of the first message. The method may include receiving a second message to perform the operation of the first component associated with the first key-value and the second component associated with the second key-value. The second message may include at least one of the first key, the number associated with the first key-value, the second key, the number associated with the second key-value, the location of the first component, the location of the second component, or a timestamp of the second message. The method may include comparing the first message and the second message and determining whether the first key, the number associated with the first key-value, the second key, the number associated with the second key-value, the location of the first component, and the location of the second component of the first message and the second message match. The method may include updating, responsive to the first message and the second message matching, the first message and the second message based on which include a most recent message based on the timestamp of the first message and the timestamp of the second message.

In one example, the method may include signing the first message, using a verification module, to prevent the first message being modified without verification of an operator. The method may include storing the first message on a first storage device during a replacement of one or both of the first component and the second component. The first message may be compared to the second message to authenticate the first key-value and the second key-value. The method may include communicating one or both of the first message and the second message to an off-board system. The method may include encrypting one or both of the first key-value and the second key-value.

In one embodiment, a system is provided that may include a first storage device, a second storage device, and a controller. The first storage device may receive a first message to perform an operation on a first component and a second component of a vehicle system associated with a first key-value pair and a second key-value pair. The message may include at least one of a first key associated with the first component, a second key associated with the second component, a vehicle identification number, or a timestamp of the first message. The second storage device may receive a second message to perform an operation on the first component and the second component of the vehicle system associated with the first key-value pair and the second key-value pair. The message may include at least one of the first key associated with the first component, the second key associated with the second component, the vehicle identification number, or a timestamp of the second message. The controller may include one or more processors that may compare the first key, the second key, and the vehicle identification number of the first message and the second message. Responsive to the first key, second key, and the vehicle identification number of the first message and the second message matching, the controller may determine a most recent message based on the timestamp of the first message and the timestamp of the second message and the one or more processors may update the first message and the second message based on the most recent message.

In one example, the first component may be a control system of the vehicle system. The first message may include an instruction for controlling movement of the vehicle system via the control system. The second component may be an energy management system of the vehicle system. The first storage device and the second storage device may communicate with an off-board system of the vehicle system. The first storage device may communicate with the second storage device to authenticate the first key and the second key. In one example, responsive to the first key, the second key, and the vehicle identification number of the first message and the second message not matching, the one or more processors may determine a most recent message based on the timestamp of the first message and the timestamp of the second message. The one or more processors may update the first message and the second message based on the most recent message.

Public Key Infrastructure (PKI) refers to a global system of authentication, trust management, and privacy protection schemes where Certification Authorities (CA) act as electronic credentials issuers. For example, a vehicle OEM can create a signature key pair and include the public key in software installed on the storage location. Later, the vehicle OEM can distribute an update to the software signed using the private key, and any vehicle controller receiving an update can confirm it is genuine by verifying the signature using the public key. As long as the vehicle OEM keeps the private key secret, even if a bad actor tries to distribute malicious code to or attempts to access a vehicle controller, they cannot convince the vehicle's controller that any malicious code or request for access is genuine.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), apriori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into, for example, a signal that causes the vehicle to travel, to stop, or to change direction. This may be accomplished via back-propagation, feed forward processes, closed loop feedback, or open loop feedback. Alternatively, rather than using backpropagation, the machine learning system of the controller may use evolution strategies and techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models has been obtained, it may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other. Determining steps may be accomplished on-board, via an edge device, or remotely through a back-office arrangement with the inventive system authenticating digital access and communication.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:

receiving a first message to perform an operation of a first component associated with a first key-value and a second component associated with a second key-value, wherein the first message includes at least one of a first key, a number associated with the first key-value, a second key, a number associated with the second key-value, or a timestamp of the first message;

receiving a second message to perform the operation of the first component associated with the first key-value and the second component associated with the second key-value, wherein the second message includes at least one of the first key, the number associated with the first key-value, the second key, the number associated with the second key-value, or a timestamp of the second message;

comparing the first message and the second message and determining whether the first key, the number associated with the first key-value, the second key, the number associated with the second key-value of the first message and the second message match; and updating, responsive to the first message and the second message matching, the first message and the second message based on which include a most recent message based on the timestamp of the first message and the timestamp of the second message.

2. The method of claim 1, further comprising signing the first message, using a verification module, to prevent the first message from being modified without verification of an operator.

3. The method of claim 1, further comprising storing the first message on a first storage device during a replacement of one or both of the first component and the second component.

4. The method of claim 1, further comprising comparing the first message and the second message to authenticate the first key-value and the second key-value.

5. The method of claim 1, further comprising communicating the first message and the second message to an off-board system.

6. The method of claim 1, further comprising encrypting the first key-value and the second key-value.

7. A system, comprising:

a first storage device configured to receive a first message to perform an operation on a first component and a second component of a vehicle system associated with a first key-value pair and a second key-value pair, the first message includes at least one of a first key associated with the first component, a second key associated with the second component, a vehicle identification number, or a timestamp of the first message;

a second storage device configured to receive a second message to perform an operation on the first component and the second component of the vehicle system associated with the first key-value pair and the second key-value pair, the second message includes at least one of the first key associated with the first component, the second key associated with the second component, the vehicle identification number, or a timestamp of the second message; and a controller having one or more processors that is configured to compare the first key, the second key, and the vehicle identification number of the first message and the second message, and responsive to the first key, the second key, and the vehicle identification number of the first message and the second message matching, the controller is configured to determine a most recent message based on the timestamp of the first message and the timestamp of the second message and update the first message and the second message based on the most recent message.

8. The system of claim 7, wherein the first component is a control system of the vehicle system, and the first message includes an instruction for controlling movement of the vehicle system via the control system.

9. The system of claim 7, wherein the second component is an energy management system of the vehicle system.

10. The system of claim 7, wherein the first storage device and the second storage device are configured to communicate with an off-board system of the vehicle system.

11. The system of claim 7, wherein the first storage device is configured to communicate with the second storage device to authenticate the first key and the second key.

12. The system of claim 7, wherein responsive to the first key, the second key, and the vehicle identification number of the first message and the second message not matching, the one or more processors are configured to determine a most recent message based on the timestamp of the first message and the timestamp of the second message and update the first message and the second message based on the most recent message.

* * * * *